(12) United States Patent
Lund et al.

(10) Patent No.: US 7,844,397 B2
(45) Date of Patent: Nov. 30, 2010

(54) METHOD AND APPARATUS FOR HIGH ACCURACY RELATIVE MOTION DETERMINATION USING INERTIAL SENSORS

(75) Inventors: Christopher A. Lund, Otsego, MN (US); Lawrence C. Vallot, Shoreview, MN (US); Wayne A. Soehren, Wayzata, MN (US); Mario Ignagni, Roseville, MN (US)

(73) Assignee: Honeywell International Inc., Morristown, NJ (US)

( * ) Notice: Subject to any disclaimer, the term of this patent is extended or adjusted under 35 U.S.C. 154(b) by 1344 days.

(21) Appl. No.: 11/341,812

(22) Filed: Jan. 27, 2006

(65) Prior Publication Data

US 2006/0224321 A1    Oct. 5, 2006

Related U.S. Application Data

(60) Provisional application No. 60/666,256, filed on Mar. 29, 2005.

(51) Int. Cl.
*G01C 21/00*    (2006.01)

(52) U.S. Cl. .................................. 701/220; 701/215

(58) Field of Classification Search ......... 701/205–215, 701/222, 225, 220; 342/149, 152, 387
See application file for complete search history.

(56) References Cited

U.S. PATENT DOCUMENTS

| 4,470,562 | A | 9/1984 | Hall et al. |
| 4,754,280 | A | 6/1988 | Brown et al. |
| 4,924,749 | A | 5/1990 | Beyer et al. |
| 5,117,360 | A | 5/1992 | Hotz et al. |
| 5,672,872 | A | 9/1997 | Wu et al. |
| 5,757,317 | A | 5/1998 | Buchler et al. |
| 6,043,777 | A | 3/2000 | Bergman et al. |
| 6,353,412 | B1 * | 3/2002 | Soliman ..................... 342/387 |
| 6,417,802 | B1 | 7/2002 | Diesel |
| 6,474,159 | B1 | 11/2002 | Foxlin et al. |
| 6,489,922 | B1 | 12/2002 | Lin et al. |
| 6,516,021 | B1 | 2/2003 | Abbott et al. |
| 6,520,448 | B1 | 2/2003 | Doty et al. |
| 6,639,553 | B2 | 10/2003 | Lin et al. |
| 6,681,629 | B2 | 1/2004 | Foxlin et al. |
| 6,859,690 | B2 | 2/2005 | Asher et al. |
| 7,076,342 | B2 * | 7/2006 | Fukuda et al. ................. 701/4 |
| 7,136,751 | B2 * | 11/2006 | Pinto et al. .................. 701/215 |
| RE40,801 | E * | 6/2009 | Smith ......................... 701/213 |
| 2002/0109628 | A1 | 8/2002 | Diesel |

(Continued)

FOREIGN PATENT DOCUMENTS

WO    WO 98/57190    12/1998

(Continued)

*Primary Examiner*—Richard M. Camby
(74) *Attorney, Agent, or Firm*—Fogg & Powers LLC

(57) ABSTRACT

A relative navigation system including a first unit responsive to the motion of a first position, a second unit responsive to the motion of a second position and a processing unit that generates a relative navigation solution as a function of first unit information and second unit information. The generated relative navigation solution is indicative of at least one of: a relative position vector of the second position relative to the first position, a relative velocity of the second position relative to the first position, and a relative attitude of the first unit at the first position relative to the second unit at the second position.

16 Claims, 6 Drawing Sheets

U.S. PATENT DOCUMENTS

| | | |
|---|---|---|
| 2002/0147544 A1 | 10/2002 | Nicosia et al. |
| 2002/0180636 A1 | 12/2002 | Lin et al. |
| 2002/0194914 A1 | 12/2002 | Foxlin et al. |
| 2003/0146869 A1 | 8/2003 | Lin et al. |
| 2004/0030454 A1 | 2/2004 | Buchler et al. |
| 2004/0149036 A1 | 8/2004 | Foxlin et al. |
| 2005/0060092 A1 | 3/2005 | Hablani |

FOREIGN PATENT DOCUMENTS

| | | |
|---|---|---|
| WO | WO -01/80738 | 11/2001 |
| WO | WO -02/35183 | 5/2002 |
| WO | WO -2004/046748 | 6/2004 |
| WO | WO -2004/070318 | 8/2004 |

\* cited by examiner

METHOD AND APPARATUS FOR HIGH ACCURACY RELATIVE MOTION DETERMINATION USING INERTIAL SENSORS

This application claims priority to the provisional application 60/666,256 filed on Mar. 29, 2005 and is incorporated herein by reference.

GOVERNMENT LICENSE RIGHTS

The U.S. Government may have certain rights in the present invention as provided for by the terms of Government Contract # F33615-03-C-1479 awarded by USAF/AFRL.

BACKGROUND OF THE INVENTION

Inertial measurement systems are used to determine the attitude, position and velocity of an object. Typically an inertial sensor suite comprises a triad of accelerometers which measures the non-gravitational acceleration vector of an object with respect to the inertial frame, and a triad of gyroscopes which measures the angular velocity vector of an object with respect to the inertial frame. Processing the outputs of the inertial sensors through a set of strapdown navigation algorithms yields the complete kinematic state of the object. State-of-the-art commercially available inertial navigation systems can provide position accuracies on the order of 1 nautical mile per hour position error growth rate.

In some contemporary applications it is desirable to know the position of objects relative to each other, rather than in an absolute sense. Further, the accuracy desired is on the order of a centimeter, rather than a nautical mile.

Two exemplary applications that require very accurate knowledge of relative position of objects include radiation emitter location determination systems, and ultra-tightly coupled GPS-inertial navigation systems. These types of systems include a master inertial sensing unit in communication with at least one remote slave inertial sensing unit that is co-located with an antenna. The instantaneous relative position and relative velocity vectors between the master and slave inertial sensor units are required to satisfy the stringent accuracy requirements placed on these systems. The nominal baseline vector between the master and slave inertial sensor units is known in such systems; however, the slave inertial sensor system and master inertial sensor system are often moving relative to each other due to vibration and flexure of the vehicle, and so the baseline is in reality only approximately known.

In an exemplary application, one of the inertial sensor systems is located on the wing of an aircraft in flight and the other is located on the body of the aircraft. In flight, the aircraft undergoes flexure effects at one or more prominent resonant frequencies that cause the relative sensor positions to oscillate about the end positions of the baseline between the master and slave inertial measurement units. In the case where the inertial measurement unit is close to the wingtip of an aircraft, the amount of sensor offset from the baseline can be greater than a meter. Further, in this exemplary application, an antenna co-located with the inertial measurement unit responds to the same large flexure motion. Consequently, unless the relative position is corrected for the flexure motion, user systems that utilize the signal from the antenna may experience degraded performance.

The need exits to determine large amplitude, high-frequency, relative motions of structural elements at centimeter-level accuracies.

SUMMARY OF THE INVENTION

One aspect the present invention provides a relative navigation solution including a first unit responsive to the motion of a first position, a second unit responsive to the motion of a second position and a processing unit that generates a relative navigation solution as a function of first unit information and second unit information. The generated relative navigation solution is indicative of at least one of: a relative position vector of the second position relative to the first position, a relative velocity of the second position relative to the first position, and a relative attitude of the first unit at the first position relative to the second unit at the second position.

Another aspect of the present invention provides a system including a first unit located at a first position, the first unit operable to generate first unit information that is responsive to a motion of the first position and a second unit located at a second position nominally offset from the first position by a nominal lever-arm, the second unit operable to generate second unit information that is responsive to a motion of the second position and a processing unit operable to receive the first unit information from the first unit and the second unit information from the second unit. The processing unit is additionally operable to generate compensated sensor information from the first unit information and the second unit information. The processing unit generates resets to relative states of a relative navigation solution as a function of the compensated sensor information and reference information. The compensated sensor information is generated from the first unit information and the second unit information. The reference information is indicative of at least one of a nominal lever-arm of the second position relative to the first position and a nominal relative velocity of the second position relative to the first position.

Yet another aspect of the present invention provides a method including receiving sensor data from at least two sensors, compensating the received sensor data to generate compensated sensor information, generating a relative navigation solution as a function of at least the compensated sensor information, and generating corrective feedback as a function of at least the relative navigation solution and reference information The sensor data is indicative of a motion of a first position and a motion of a second position.

Yet another aspect of the present invention provides software embodied on a storage medium comprising a plurality of program instructions. The software is operable to cause a processor to receive first unit information and second unit information from at least two sensors, generate compensated sensor information as a function of at least the first unit information and the second unit information, and generate a relative navigation solution as a function of at least the compensated sensor information.

Yet another aspect of the present invention provides an apparatus including means for receiving sensor data from at least two sensors, means for generating compensated sensor information as a function of at least the sensor data and means for receiving a relative navigation solution from the means for generating.

BRIEF DESCRIPTION OF THE DRAWINGS

Like reference numbers and designations in the various drawings indicate like elements.

DETAILED DESCRIPTION OF THE INVENTION

The present invention addresses a system implementation and software processing concept for achieving very high accuracy relative positioning for a broad class of applications. The concept utilizes the outputs of a pair of inertial measurement units, and a set of relative navigation algorithms to determine the time-varying relative position vector between the units. The error in the relative navigation solution, which inevitably arises due to constant and random inertial sensor errors, is controlled using a fusion filter to provide corrective feedback employing the nominally known lever-arm vector between the inertial measurement units as a source of reference relative position data.

Figure 1:
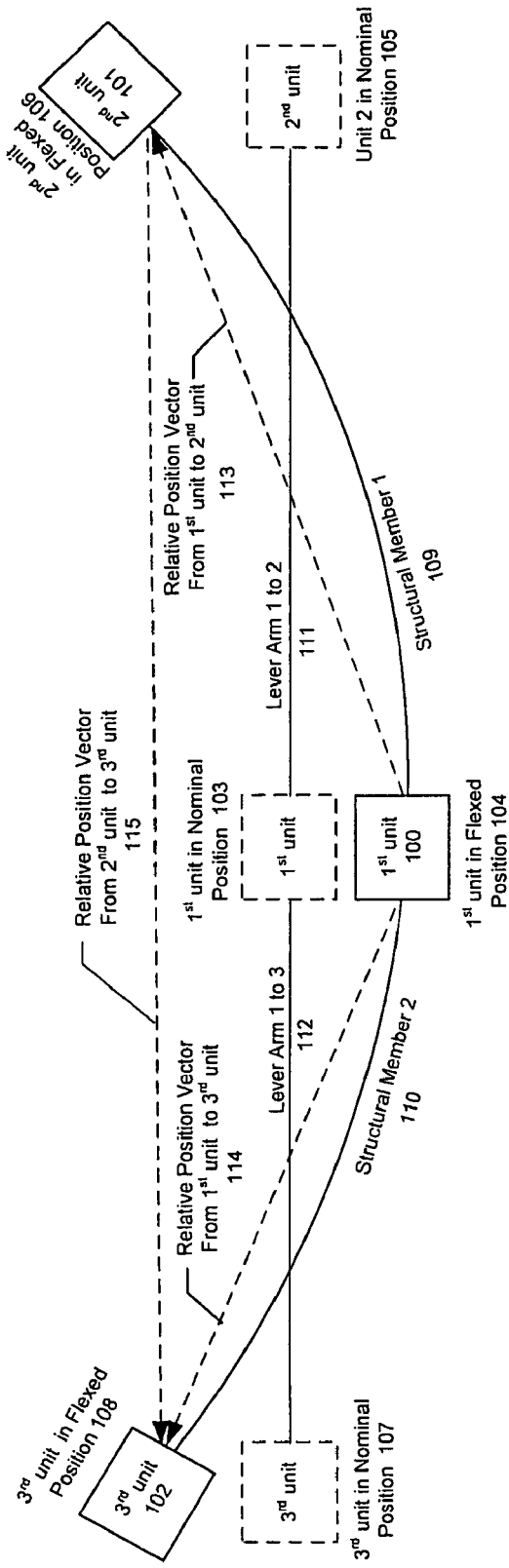
FIG. 1 illustrates a configuration of three inertial measurement units at different positions with respect to each other on a flexible structure in accordance with one embodiment of the present invention.

FIG. 1 illustrates a configuration of three inertial measurement units 100, 101 and 102 at different positions with respect to each other on a semi-flexible structure in accordance with one embodiment of the present invention. As defined herein, a semi-flexible structure is a structure designed to be substantially rigid with some flexure under some conditions. Airborne vehicles and tall buildings are examples of semi-flexible structures. An airplane is substantially rigid but the wings of the airplane flex when the airplane is operational. A sky scraper bends slightly when subjected to strong winds. In one implementation of this embodiment, the three inertial measurement units 100, 101 and 102 are located on a flexible structure that is less rigid than the exemplary semi-flexible structures. In another implementation of this embodiment, one of the three inertial measurement units is located on a first semi-flexible structure and the other two inertial measurement units are located on a second semi-flexible structure. In yet another implementation of this embodiment, one of the three inertial measurement units is located on a flexible structure and the other two inertial measurement units are located on a second semi-flexible structure.

The three inertial measurement units 100, 101 and 102 are located on a structure or vehicle at different positions 104, 106 and 108, respectively. The three inertial measurement units 100, 101 and 102 are also referred to here as "first unit 100, second unit 101 and third unit 102" respectively. In one implementation of this embodiment, the structure or vehicle is a semi-flexible structure. In another implementation of this embodiment, the structure or vehicle is a flexible structure. The first unit 100 is responsive to the motion of the first position 103 located on the structural members 109 and/or 110. The second unit 101 is responsive to the motion of the second position 105 on the structural member 109. The third unit 102 is responsive to the motion of the third position 107 on the structural member 110.

As shown in FIG. 1, the first inertial measurement unit 100 has moved to first position 104, the second inertial measurement unit 101 has moved to second position 106 and the third inertial measurement unit 102 has moved to third position 108 due to flexure of the supporting structure or vehicle. For greater generality, a first structural element 109 and a second structural element 110 are depicted in FIG. 1. In one implementation of this embodiment, the first structural member 109 is the right wing of an aircraft, and the second structural member 110 is the left wing of the aircraft. In another implementation of this embodiment, the first structural member 109 and the second structural member 110 are different parts of a single structure, such as the fuselage of an aircraft. In yet another implementation of this embodiment, the first structural member 109 and the second structural member 110 are different parts of a single structure, such a bridge being monitored for structural integrity.

When in their nominal (unflexed) positions 103, 105 and 107, the three inertial measurement units 100, 101 and 102 are located relative to each other by nominal lever-arms 111 and 112 that both have a known length. The term "nominal positions" defines any selected set of positions for the inertial measurement units in a given system. As shown in FIG. 1, the nominal positions include the set of positions of the three inertial measurement units 100, 101 and 102 on a flexible or semi-flexible structure that is in an un-flexed state. Other nominal positions are possible.

In the development of the relative navigation system concept, the known nominal lever-arms 111 and 112 are utilized as reference inputs to a closed-loop error-control scheme. In this exemplary case, the flexure motion results in a zero-mean oscillatory motion for each of the three inertial measurement units 100, 101 and 102 about their nominal positions 103, 105 and 107, respectively.

When in their non-nominal positions (flexed) positions, the three inertial measurement units 100, 101 and 102 are located relative to each other by relative position vectors 113 and 114. The term non-nominal position is also referred to here as "flexed position." As used herein the term "non-nominal positions" defines any set of positions for the inertial measurement units in a given system that are not in the nominal positions as defined above.

The relative position vector 113 between first unit 100 and second unit 101 represents the vector displacement between a master system (first unit 100) and a slave system (second unit 101). Similarly, the relative position vector 114 between first unit 100 and third unit 102 represents the vector displacement between the master system (first unit 100) and a second slave system (third unit 102). The relative position vector 115 between second unit 101 and third unit 102 represents the vector displacement between the first and second slave systems. In some applications it is desirable to have knowledge of the position vector of the second slave unit relative to the first slave unit. This can easily be achieved by subtracting the relative position vector 113 of second unit 101 relative to first unit 100 from the relative position vector 114 of third unit 102 relative to first unit 100.

Figure 2:
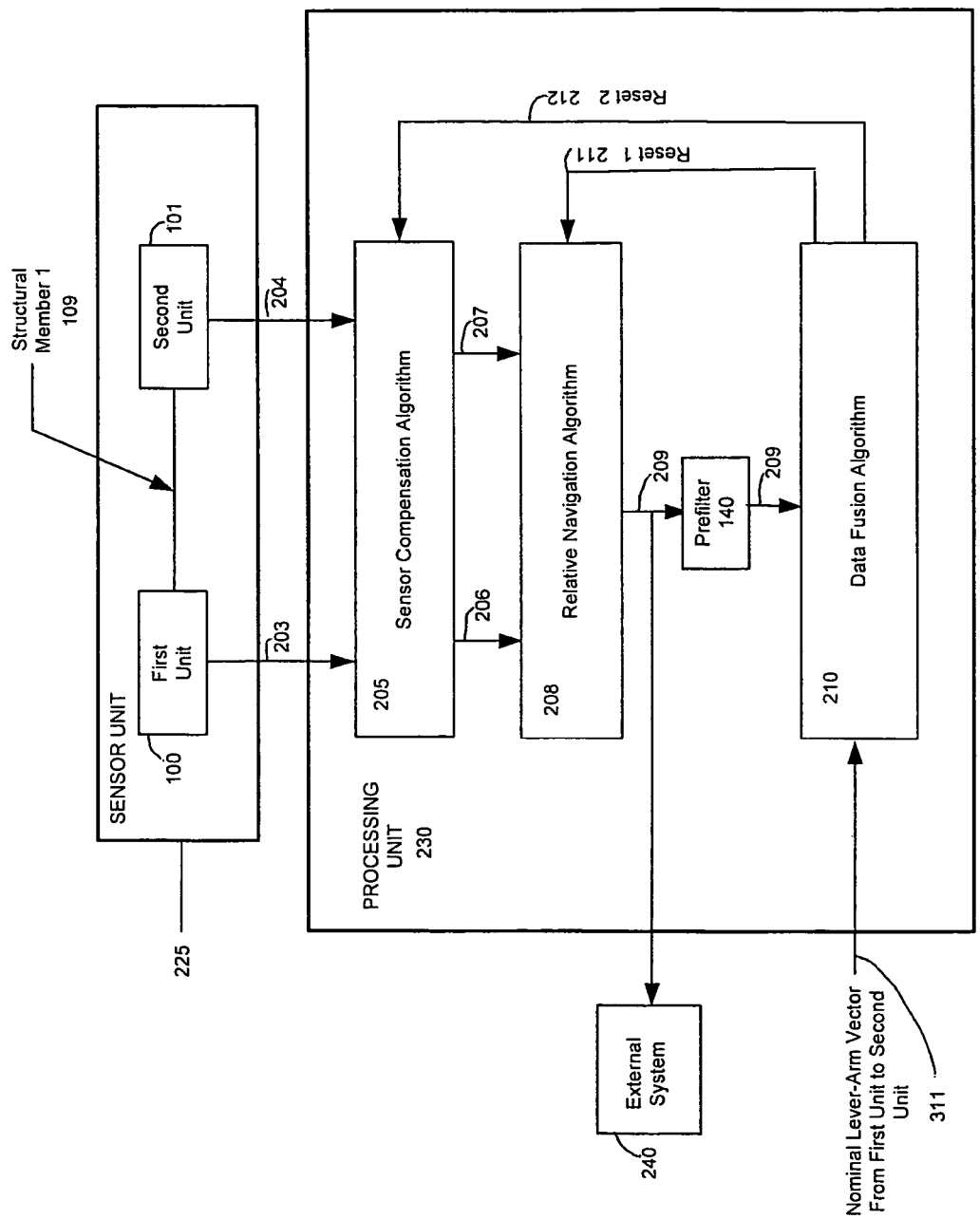
FIG. 2 is a block diagram of an embodiment of a system which incorporates two inertial measurement units.

FIG. 2 is a block diagram of an embodiment of a system 10 which incorporates two inertial measurement units. In this exemplary embodiment, the system 10 is also referred to here as a "relative navigation system" 10. In another implementation of this embodiment, the system 10 is a relative motion measurement system. The relative navigation system 10 includes the sensor unit 225, a processing unit 230, and an external system 240. The sensor unit 225 includes first unit 100 and second unit 101, which transmit sensor data 203 and 204, respectively, to the processing unit 230. The first unit 100 and second unit 101 are sensors. The sensor data 203 and sensor data 204 are also referred to here as "first unit information 203" and "second unit information 204," respectively. The relative and nominal positions of the first unit 100 and second unit 101 are described with reference to the relative and nominal positions of the first unit 100 and second unit 101 in FIG. 1. The processing unit 230 includes a relative navigation algorithm 208, a data fusion algorithm 210, and a sensor compensation algorithm 205, which compensates the received sensor data 203 and 204 to produce compensated sensor information 206 and 207. As shown in FIG. 2, the processing unit 230 includes a prefilter 140 to filter the relative navigation solution 209 before it is received at the data fusion algorithm 210. In one implementation of this embodiment, the prefilter 140 in included in the data fusion algorithm 210. In another implementation of this embodiment, the prefilter 140 in included in the relative navigation algorithm 208. In yet another implementation of this embodiment, the sensor data is inertial sensor data.

The relative navigation algorithm 208 processes the compensated sensor information 206 and 207 to generate the relative navigation solution 209. The generated relative navigation solution 209 is indicative of at least one of: a relative position vector 113 (FIG. 1) from the second position 106 relative to the first position 104, a relative velocity of the second position 106 relative to the first position 104, and a relative attitude of the first unit 100 at the first position 104 relative to the second unit 101 at the second position 106. The relative navigation solution 209 comprises relative states.

The prefilter 140 filters error information as described in detail below. The data fusion algorithm 210 receives the relative states of the relative navigation solution 209 from the prefilter 140. The relative states are a function of at least the compensated sensor information 206 and 207 and the reference information 311. In one implementation of this embodiment, the prefilter includes at least one of a first-order roll-off filter and a notch filter. The prefilter 140 processes the outputs received from the relative navigation algorithm 208.

The data fusion algorithm 210 processes reference information 311 and the outputs received from the prefilter 140 to provide control of the errors arising from errors in the sensor data 203 and 204. The reference information 311 is data representative of the nominal lever-arm 111 (FIG. 1) between the second position 105 relative to the first position 103 and a nominal relative velocity of the second position 10S relative to the first position 103.

In one implementation of this embodiment, the data fusion unit is a Kalman filter. Kalman filters are well known in the art. The terms "data fusion unit" and "Kalman filter" are used interchangeably within this document, however other implementations data fusion units are possible.

The relative navigation solution 209 comprises the position of the second unit 101 relative to the first unit 100, a velocity of the second unit 101 relative to the first position 104, and an attitude of the second unit 101 relative to the first unit 100. The data fusion module 210 provides closed-loop error control by generating resets 211 to the relative navigation states and resets 212 to the sensor compensation coefficients. In one implementation of this embodiment, the resets 211 are algorithm resets 211 and the resets 212 are device resets 212. The algorithm resets 211 provide corrective feedback to the relative navigation algorithm 208 to control errors in the relative navigation solution 209. The device resets 212 proved corrective feedback to the sensor compensation algorithm 205. The device resets 212 control errors in one of the first unit 100 or the second unit 101. As defined herein, the device resets 212 are sensor compensation coefficient resets.

As shown in FIG. 2, the relative navigation solution 209 is also provided as output to an external system 240.

The first unit 100 and the second unit 101 communicate via a wireless or a wired connection with the processing unit 230. The relative navigation algorithm 208 is communicatively coupled to the data fusion module 210 to allow input and output signal flow between the two modules. The relative navigation algorithm 208 is also communicatively coupled to the sensor compensation algorithm 205 to allow input and output signal flow between the two modules.

The second unit 101 located at a second nominal position 105 (FIG. 1) is nominally offset from the first position 103 (FIG. 1) by a nominal lever-arm 111 when the structural member 109 is unflexed. The first unit 100 located at a first position 104 is operable to generate first unit information 203 that is responsive to a motion of the first position 104. The second unit 101 is operable to generate second unit information 204 that is responsive to a motion of the second position 106.

The processing unit 230 generates a relative navigation solution 209 as a function of first unit information 206 and second unit information 204. The generated relative navigation solution 209 is indicative of at least one of: a relative position (indicated by the relative position vector 113 in FIG. 1) of the second position 106 relative to the first position 104, a relative velocity of the second position 106 relative to the first position 104, and a relative attitude of the first unit 100 at the first position 104 relative to the second unit 101 at the second position 105.

The processing unit 230 receives the first unit information 203 from the first unit and the second unit information 204 from the second unit. The processing unit 230 additionally generates compensated sensor information 206 and 207 from the first unit information 203 and the second unit information 204. Specifically, the processing unit 230 generates resets 211 to the relative states of the relative navigation solution 209 and resets 212 to the compensated sensor information.

The sensor compensation algorithm 205 is operable to generate the compensated sensor information 206 and 207 from the first unit information 203 and the second unit information 204. The relative navigation algorithm 208 is operable to receive the compensated sensor information 206 and 207 from the sensor compensation algorithm 205, receive the resets 211 from the data fusion algorithm 210 and to generate the relative states as a function of at least the compensated sensor information.

The data fusion algorithm 210 is operable to receive the relative navigation solution 209 and the reference information 311 to generate resets 211 and 212 based on the relative navigation solution 209 and the reference information 311. The data fusion algorithm 210 is also operable to output the resets 211 to the relative navigation algorithm 208. The data fusion algorithm 210 is also operable to output the resets 212 to the sensor compensation algorithm 205. The resets 211 and 212 are corrective feedback used to control errors in the relative navigation solution 209.

Figure 3:
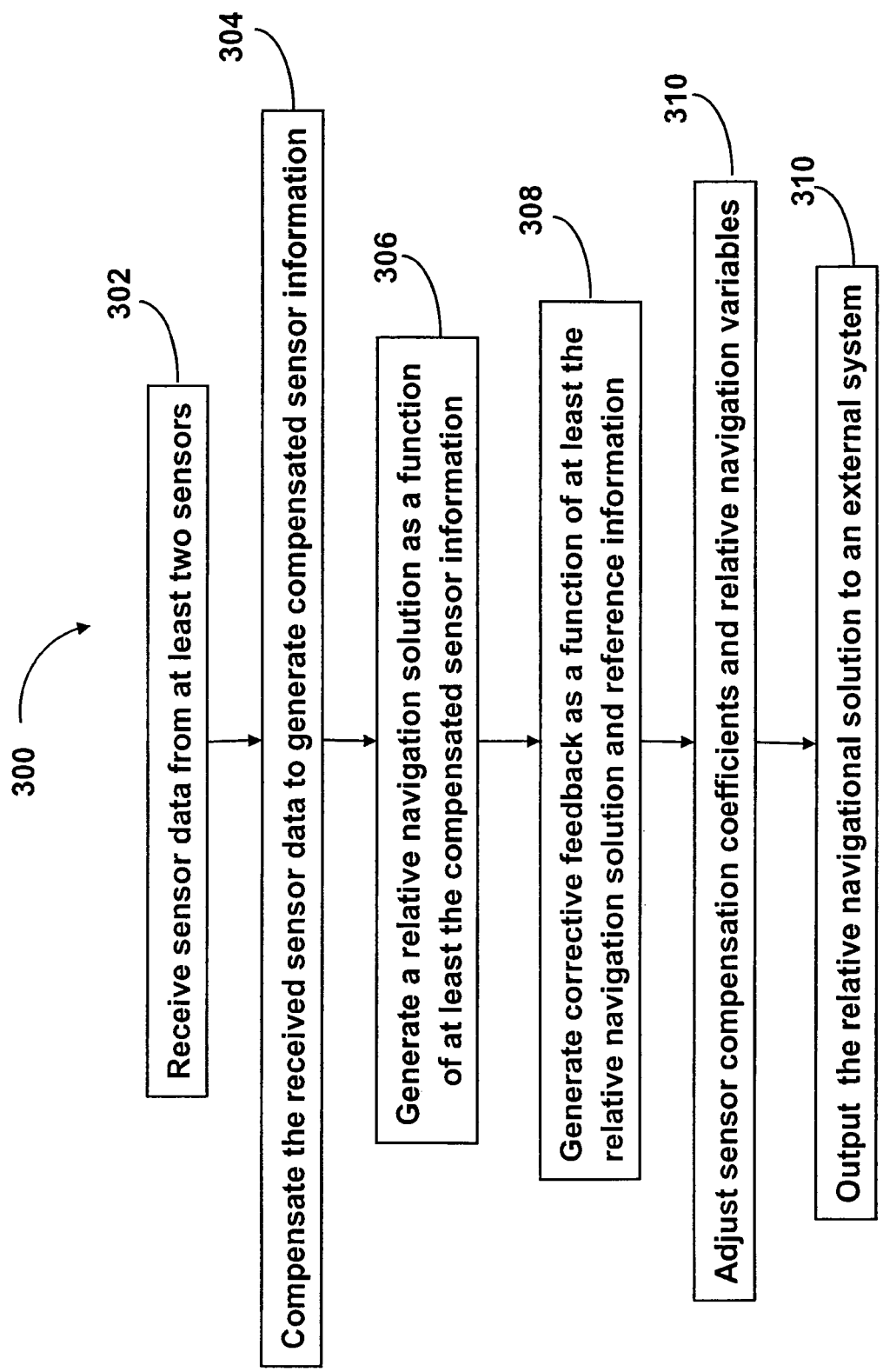
FIG. 3 is a flow diagram of an embodiment of a method to determine relative motion between inertial measurement units.

The flow of these operations is outlined below with reference to the flow diagram 300 in FIG. 3. FIG. 3 is a flow diagram 300 of an embodiment of a method to determine relative motion between inertial measurement units 100 and 101. The method is used to accurately determine the relative navigation solution between pairs of inertial sensing units 100 and 101. The operations inherent in FIG. 3 are described with reference to the exemplary system 10 of FIG. 2. An implementation of flow diagram 300 is implemented by software embodied on a storage medium comprising a plurality of program instructions. The sensor compensation algorithm 205, the relative navigation algorithm 208, the data fusion algorithm 210 include the software required to provide the described operations.

At block 302, the processing unit 230 receives sensor data, such as a set of sensor data 203 and 204, from at least two sensors, such as the first unit 100 and second unit 101, respectively. The sensor data 203 and 204 is received at the sensor compensation algorithm 205 in the processing unit 230. The sensor data 203 and sensor data 204 are indicative of a motion of a first position of the first unit 100 and a motion of a second position of the second unit 101, respectively.

In one implementation of this embodiment, the sensor data is in the form of incremental angles ("delta-theta's") from the three members of the gyro triad, and the incremental velocities ("delta-v's") from the three members of the accelerometer triad. In another implementation of this embodiment, the frequency of sensor data transmittal is greater than 100 Hz.

At block 304, the sensor compensation algorithm 205 compensates the inertial sensor data to generate compensated sensor information 206 and 207. The compensated sensor information is indicative of at least one of a relative position vector of the second position relative to the first position, a relative velocity of the second position relative to the first position and a relative attitude of the first unit at the first position relative to the second unit at the second position. Specifically, the sensor data 203 and 204 is compensated for bias adjustments determined by the data fusion algorithm 210 in the course of system operation (as described below with reference to block 308). In one implementation of this embodiment, the sensor data 203 and 204 is compensated for scale factor. Other compensation factors are possible. This is important in many applications where some adjustment in the sensor bias compensation coefficients from their factory-set values is necessary to achieve maximum system performance.

At block 306, the sensor compensation algorithm 205 generates a relative navigation solution 209 as a function of at least the compensated sensor information 206 and 207. The sensor compensation algorithm 205 in the processing unit 230 receives resets 212 from the data fusion algorithm 210. The resets 212 are generated based on the relative navigation solution information and the reference information. The reference information is indicative of at least one of a nominal position of the second unit 101 relative to the nominal position of the first unit 100 and a nominal velocity of the second unit 101 relative to the first unit 101 (FIG. 1 and FIG. 2). The sensor compensation algorithm 205 outputs the compensated sensor information 206 and 207 to the relative navigation algorithm 208.

The compensated sensor information 206 and 207 are processed through a set of strapdown relative navigation algorithms 208 to yield the relative attitude matrix, the relative velocity vector and relative position vector of the slave inertial measurement unit in relationship to the master inertial measurement unit.

In one implementation of this embodiment, the relative navigation position vector is periodically compared (for example, on the order of 1 Hz) to the nominally known lever-arm 109 (FIG. 2) between the master inertial measurement unit 100 and the respective slave inertial measurement unit 101 and 103. This provides a measurement to the data fusion algorithm 210 referred to here as "fusion filter" 210. In an implementation of an embodiment using the configuration of units 100, 101 and 102 of FIG. 1, the relative navigation position vector is periodical compared to the nominally known lever-arms 111 and 112 between the master inertial measurement unit 100 and the respective slave inertial measurement unit 101 and 103.

Subsequently at block 308, data fusion algorithm 210 generates corrective feedback as a function of at least the relative navigation solution and the reference information. The data fusion algorithm 210 determines optimal corrections to the relative navigation states and the sensor bias compensation coefficients. The corrective feedback is shown as resets 211 and 212 in FIG. 2.

The data fusion algorithm 210 outputs incremental adjustments to the sensor compensation algorithm 205 and the relative navigation algorithm 208. The algorithm resets 211 and device resets 212 are output to the relative navigation algorithm 208 and sensor compensation algorithm 205, respectively. The discrete resets 211 and 212 are transmitted at the fusion filter update rate. In one implementation of this embodiment, the fusion filter update rate is on the order of 1 Hz.

At block 310, the algorithm resets 211 and device resets 212 received at the sensor compensation algorithm 205 and the relative navigation algorithm 208, respectively, are used to adjust the sensor compensation coefficients and the relative navigation variables. The sensor compensation coefficients are the device resets 212, which control errors in one of the first unit 100 or the second unit 101. The corrections to the relative navigation variables or the relative navigation solution 209 are the algorithm resets 211.

At block 312, the relative navigation algorithm 208 outputs the relative navigation solution 209 to one or more external systems 240, such as user systems, for the purpose of incorporating the relative navigation solution 209 into subsequent processing operations and/or into monitoring operations. This can be carried out at the highest rate at which the relative navigation solution is refreshed. In one implementation of this embodiment, the relative navigation solution is refreshed at a 100 Hz rate.

Figure 4:
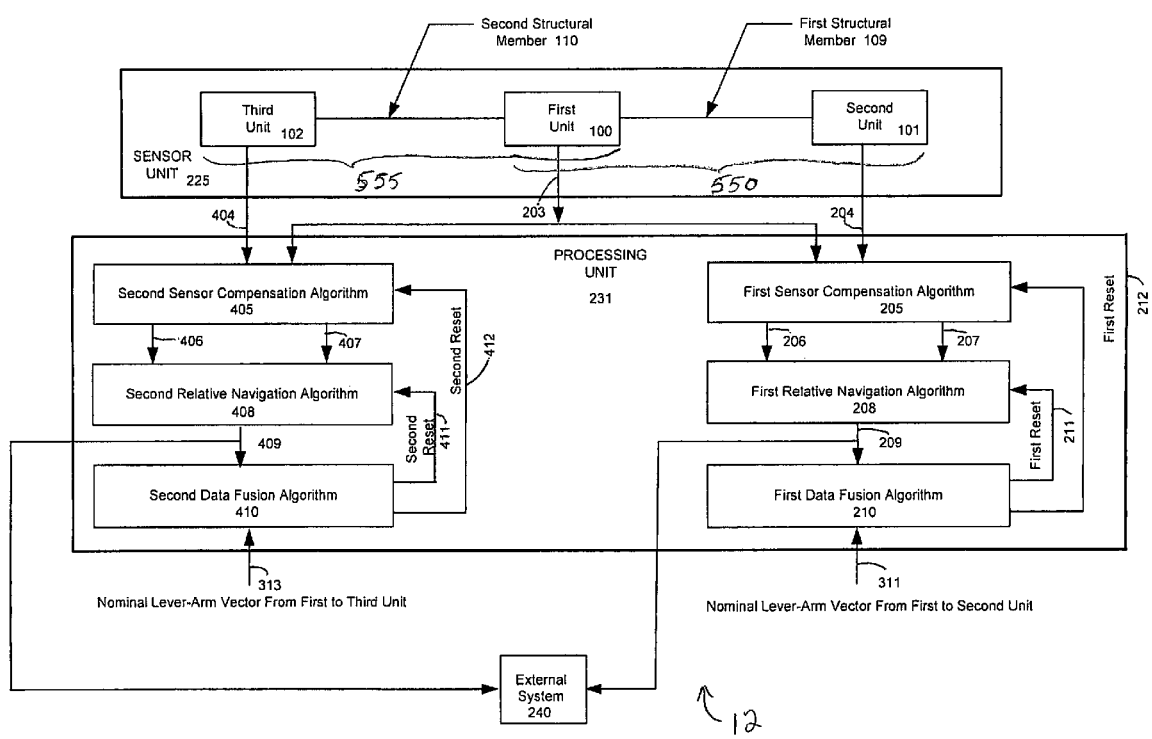
FIG. 4 is a block diagram of an embodiment of a system which incorporates three inertial measurement units.

FIG. 4 is a block diagram of an embodiment of a system 12 which incorporates three inertial measurement units. The three inertial sensing units depicted in FIG. 4 are configured as described above with reference to FIG. 1. In this exemplary embodiment, the system 12 is also referred to here as "relative navigation system" 12. In another implementation of this embodiment, the system 12 is a relative motion measurement system 12. The system 12 includes sensor unit 225, a processing unit 231 and an external system 240. The sensor unit 225 includes first unit 100, second unit 101 and third unit 102. The processing unit 231 includes sensor compensation algorithms (referred to here as "first sensor compensation algorithm" 205, and "second sensor compensation algorithm" 405), relative navigation algorithms (referred to here as "first relative navigation algorithm" 208, and "second relative navigation algorithm" 408), data fusion algorithms (referred to here as "first data fusion algorithm" 210, and "second data fusion algorithm" 410).

The second unit 102 transmits sensor data 204 to the first sensor compensation algorithm 205. The third unit 102 transmits sensor data 404, also referred to as "third unit information 404," to the second sensor compensation algorithm 405. The first unit 100 transmits sensor data 203 to both the first sensor compensation algorithm 205 and the second sensor compensation algorithm 405.

The relative motion between the first unit 100 and the third unit 102 is obtained in a manner similar to the method described above for determining the relative motion between the first unit 100 and to the second unit 101 with reference to FIG. 2. A second reference information 313 comprises the nominal position of the third unit 102 relative to the first unit 100 and a nominal relative velocity of the third position 107 (FIG. 1) relative to the first position 103. The processing unit 231 determines the relative navigation solution 409 of the third unit 102 relative to the first unit 100, and generates resets 411 and 412 as a function of the relative navigation information 409 and reference information 112.

The first unit 100 and the third unit 102 communicate via a wireless or a wired connection with the processing unit 231. The second relative motion algorithm 408 is communicatively coupled to the second data fusion algorithm 410 to allow input and output signal flow between the second relative motion algorithm 408 and the second data fusion algorithm 409. The second relative motion algorithm 408 is also communicatively coupled to the second sensor compensation algorithm 405 to allow input and output signal flow between the two modules.

As shown in FIG. 4, a plurality of inertial sensor unit pairs may be utilized in a given application. System 12 includes a plurality of units in addition to the first unit 100 and the second unit 102, for example units 100, 101 and 102. The plurality of units 100, 101 and 102 are each located at a related position and are each operable to generate unit information that is responsive to a motion of the respective unit 100, 101 and 102. Each of the plurality of units 101 and 102 exclusive of the first unit 100 are located at a position nominally offset from the location of the first unit 100 at the first position by a respective nominal lever-arm 111 and 112, respectively. Each of the plurality of units 101 and 102 exclusive of the first unit 100 forms a pair of units with the first unit. The pair of units including first unit 100 and second unit 101 is generally indicated as 550 in FIG. 4. The pair of units including first unit 100 and third unit 102 is generally indicated as 555 in FIG. 4.

The plurality of relative navigation algorithms 208 and 408 in the processing unit 231 are each associated with a respective pair of units 550 and 555. Each relative navigation algorithm 208 and 408 is operable to generate relative states of a relative navigation solution for each pair of units 550 and 555. a plurality of data fusion algorithms 210 and 410 in the processing unit 231 are each associated with a respective one of the plurality of relative navigation algorithms 208 and 408 and a respective pair of units 550 and 555. Each data fusion algorithm 210 and 410 generates respective resets 211 and 411 to the relative states of the respective relative navigation solution 209 and 409 for each respective pair of units 550 and 555.

It is clear, by direct extension of the concept illustrated in FIG. 4, that a plurality of more than three inertial sensor units forming more than two pairs of inertial sensor units may be utilized in a given application. If enough inertial sensors are present in a given application the processing unit 231 may have to be broken into multiple processing units. One potential implementation would be to collocate a processing unit with each inertial sensor, with the exception of unit 1. Each of these collocated processing units would run one instance of the sensor compensation, relative navigation, and data fusion algorithms. A relative navigation solution may be established for any slave unit in relation to a single master unit and, when desired, the relative navigation states of two such solutions can be differenced to yield the relative navigation states relevant to the two slave units.

Figure 5:
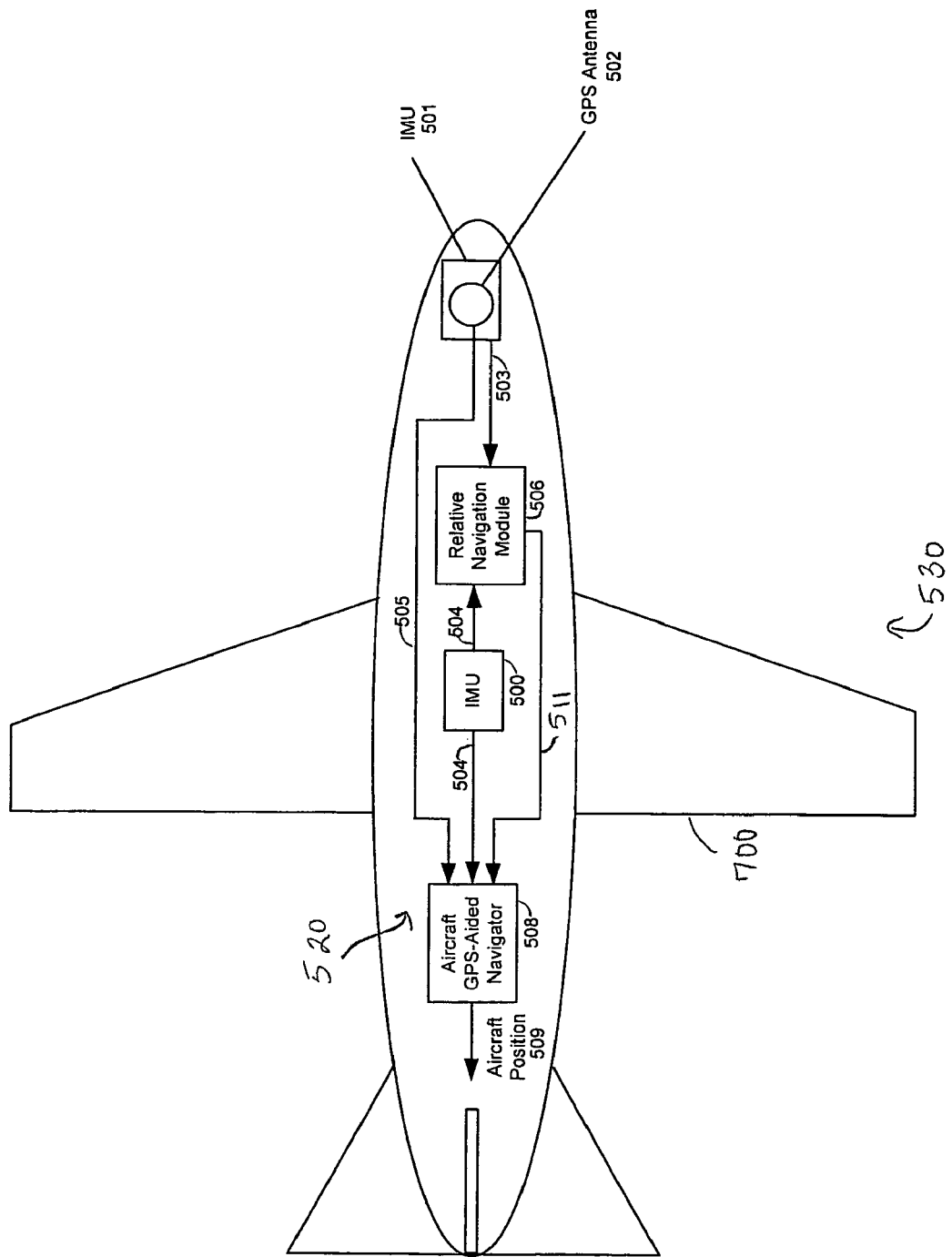
FIG. 5 is a conceptual diagram of an embodiment of a relative navigation system in a first application.

FIG. 5 is a conceptual diagram of an embodiment of a relative navigation system 530 in a first application. In the embodiment shown in FIG. 5, the relative navigation system 530 comprises an ultra-tightly-coupled global positioning system (GPS) inertial navigation system (INS) system. The relative navigation system 530 includes an inertial navigation system 520 and a global positioning system antenna 502 on an airborne vehicle 700.

The inertial navigation system 520 comprises a first inertial measurement unit (IMU) 500, a second inertial measurement unit 501, a relative navigation module 506, also referred to as a relative navigation algorithm 506, and an aircraft global positioning system-aided navigator 508.

It is seen by reference to FIG. 5 that the output 503 of the second inertial measurement unit (IMU) 501 co-located with the GPS antenna 502 is processed in the relative navigation module 506 together with the output 504 of the inertial measurement unit 500 of the inertial navigation system 520 to be aided. The relative navigation solution 511 is output from the relative navigation module 506 to the aircraft GPS-aided navigator 508. The GPS-antenna output 505 is also output to the aircraft GPS-aided navigator 508. The aircraft GPS-aided navigator 508, when enhanced by knowledge of the relative navigation solution 511, establishes the aircraft navigation solution 509 with a high degree of accuracy.

Figure 6:
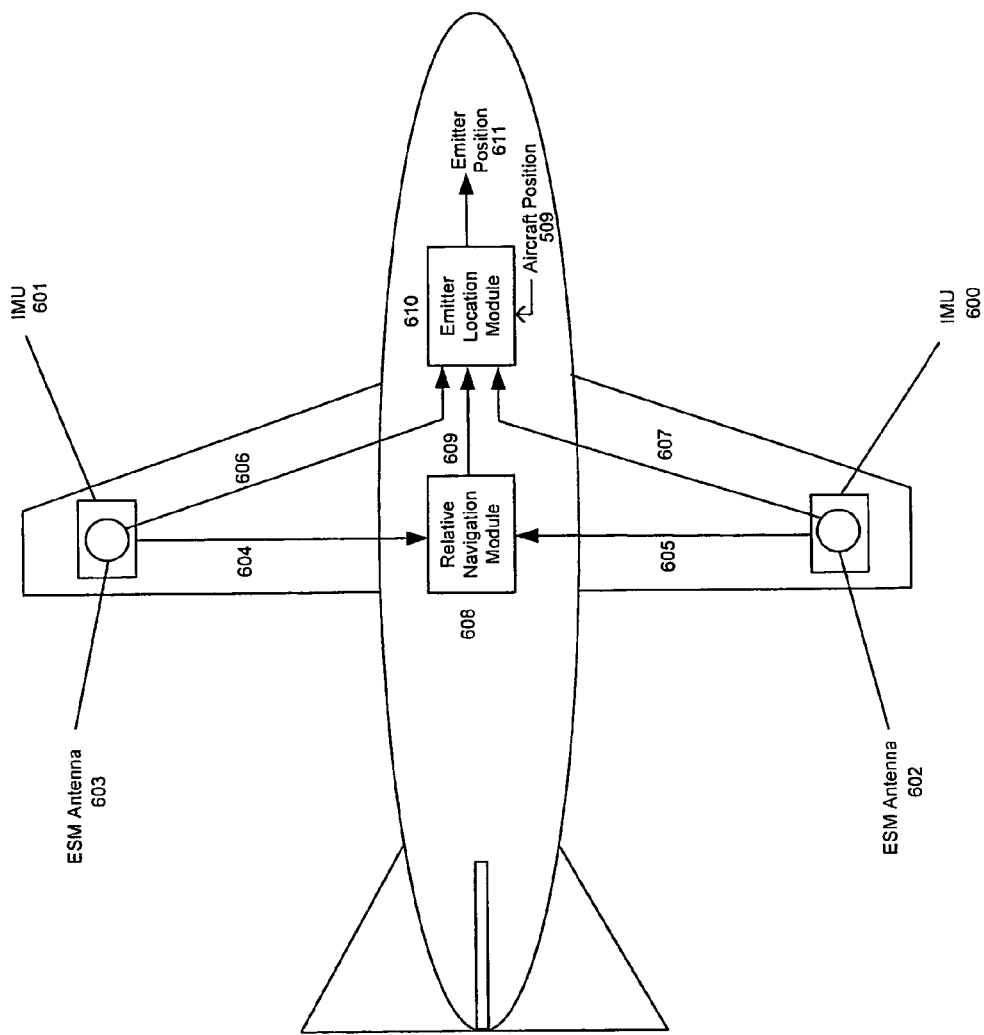
FIG. 6 is a conceptual diagram of an embodiment of a relative navigation system in a second application.

FIG. 6 is a conceptual diagram of an embodiment of a relative navigation system in a second application. In the embodiment shown in FIG. 6, the relative navigation system 630 comprises an electronic support measures (ESM) emitter location system 620. As depicted in FIG. 6, ESM antennas 602 and 603 are located on the two wing tips of the airborne vehicle 700. The purpose of each antenna 602 and 603 is to receive electromagnetic energy transmissions from an unknown electromagnetic radiation source. By comparing signals received at the two antennae 602 and 603, it is possible via a basic triangularization technique to determine the position of the emitter.

The accuracy of the triangularization process is adversely impacted by errors in the relative positions, velocity and attitude between the two ESM antennas 602 and 603. To counter this, inertial measurement units (IMU) 600 and 601, co-located, respectively, with antennas 602 and 603, and provide inertial sensor data 604 and 605, respectively, responsive to the motion of the two inertial measurement units 600 and 601. Then, employing a relative navigation module 608, precise knowledge of the relative navigation solution 609 between the two antenna locations becomes available. The relative navigation solution 609, together with the basic antenna outputs 606 and 607, allows the emitter source to be located relative to the aircraft body frame. If, as depicted, the absolute aircraft position 509 is also available for use, as for example would be the case when the system of FIG. 5 is also employed on the aircraft, the emitter position 611 could be determined in an absolute geographic coordinate frame. This operation would take place in the emitter location module 610 depicted in FIG. 6.

As is evident from the foregoing discussion, one implementation of the embodiment of the relative navigation system requires that two major computational concepts be defined, as follows:

1. Strapdown computational concept for determining relative attitude, velocity and position utilizing sensor outputs (delta theta's and delta v's) from the two inertial measurement units (IMU's)
2. A Kalman filter concept that can be used to control the errors that will inevitably develop in the relative navigation solution variables due to sensor errors including inertial sensor errors The establishment of a set of strapdown algorithms to be used in the relative navigation solution is first addressed. The principles of classic mechanics can be utilized to advantage in expressing the relative navigation solution in a form that is closely related to that conventionally utilized in strapdown inertial systems.

The relative navigation solution entails the computation of a relative attitude matrix, relative velocity vector, a relative position vector, and a prefiltered relative position (flexure) vector. The relative attitude matrix is defined by the continuous differential equation $$\dot{C}=C\{\omega^s\}-\{\omega^m\}C \quad C(0)=C_0 \tag{1}$$

The relative velocity vector is defined by the continuous differential equation $$\dot{U}+\{\omega^m\}U=CA^s-A^m \quad U(0)=\{\omega^m\}R \tag{2}$$

where $$U=V+\{\omega^m\}R \tag{3}$$

The relative position vector is defined by continuous differential equation $$\dot{R}+\{\omega^m\}R=U \quad R(0)=L \tag{4}$$

The prefiltered relative flexure vector is defined by continuous differential equation $$\dot{R}_f=(R-L-R_f)/\tau \quad R_f(0)=L \tag{5}$$

where the following definitions apply
    C=relative attitude matrix
    U=relative velocity variable
    R=relative position vector
    $R_f$=prefiltered relative flexure vector
    $\omega^s$=angular velocity vector measured by slave inertial unit
    $\omega^m$=angular velocity vector measured by master inertial unit
    $A^s$=non-gravitational accelaeration vector measured by slave inertial unit
    $A^m$=non-gravitational accelaeration vector measured by master inertial unit
    $C_0$=nominal offset matrix between master and slave frames
    L=nominal lever-arm vector between master and slave inertial units
    τ=prefilter time constant and where all relative navigation state vectors are expressed with components in the reference frame tied to the master inertial sensor unit.

The true relative kinematic velocity vector, V, of the second unit in relationship to the first is determined via the relationship $$V=U-\{\omega^m\}R \tag{6}$$

where $\omega^m$ is the angular rate vector measured by the master IMU, and R is the total relative position vector (flexure+lever-arm).

The prefiltered flexure vector, $R_f$, provides the basis for a set of measurements to an error-control Kalman filter. However, it is also possible to aid the system using a reference velocity input, where the reference velocity is based on the known aircraft angular velocity and the nominally known lever-arm or, explicitly, $V_{ref}=\{\omega^m\}L$.

The relative navigation equations defined by (1) through (6) are defined in the form of continuous differential equations. As a practical expedient these equations are solved using a set of discrete algorithms, similar to those that are conventional utilized in strapdown navigation systems. Also, as in conventionally utilized strapdown navigation systems, the strapdown relative navigation solution requires a set of coning and sculling corrections. These corrections are conveniently implemented within the embedded software hosted in the two inertial measurement units. In one implementation of this embodiment, the coning and sculling correction algorithms utilize high-frequency sensor sub-interval data to compute a correction to the 100 Hz incremental angles and velocities. Sensor data transmitted at the 100 Hz rate then implicitly contains all of the information necessary to accurately implement the relative attitude update, and to implement the acceleration resolution and integration portion of the relative velocity vector.

The basic attitude, velocity and position states derived from a solution of the relative navigation equations can manifest long-term drifts due to initial condition errors and inertial sensor errors. After even a relatively short time the computed relative position components will be in error by many feet. To counter this error growth, a closed-loop error control scheme is needed. In one implementation of this embodiment, an implicit source of information suitable for this purpose is the computed flexure vector, which has known limits of excursion. In such an embodiment, there is a known range of frequencies that will be manifested in the flexure motion, simple prefiltering techniques using a first-order lag and/or a notch filter will provide a substantial degree of attenuation of the flexure. What remains is a measure of the relative navigation errors resulting from initial condition and inertial sensor errors, as observed in additive noise. The relative navigation solution derived from the outputs of the two sensor triads will accurately follow the real flexure motions providing that the system is operated in a closed-loop manner. If the feedback correction is removed, the system error will grow rapidly in the presence of the large sensor errors associated with the inertial measurement units.

The Kalman filter processes measurements including the difference between quantities derived from an aiding device and the corresponding quantities derived from the navigation solution. The Kalman filter structure is such that all information is blended (i.e., integrated or fused) in an optimal manner, and is closely related to the more familiar concept of recursive least-squares estimation. Effective use of the Kalman filter requires knowledge of the following important elements: a model for the dynamic variations in the state, which takes the form of a set of differential or difference equations; a model for the constant and random errors that act as the forcing functions to the dynamic state; a model for the constant and random errors appearing in the measurements which augment or "aid" the navigation solution; and a model defining how the measurements provided to the filter are related to the filter state elements.

The outstanding attribute of the Kalman filter is that it allows all of the above elements to be accounted for in a very systematic and formalized way, making it ideal for implementation in a digital computer. The following discussion summarizes the steps implicit in the implementation of the Kalman filter. Assume that a measurement is made at the $n^{th}$ measurement update time employing an external measuring device which allows a specific linear combination of the system error states to be directly monitored. A general way of stating this in mathematical terms is as follows:

$$y_n=H_nX+\xi_n \tag{7}$$

where
    X=vector of error states
    $y_n$=vector of measurements $n^{th}$ measurement update time
    $H_n$=measurement matrix at $n^{th}$ measurement update time
    $\xi_n$=measurement noise vector applicable to $n^{th}$ measurement update time and it is assumed that, in the general case, a number of independent measurements may become available simultaneously.

The optimal utilization of information introduced through a series of measurements of the form given by (7), to estimate the state vector X in a sequential fashion, is the central problem addressed by Kalman estimation theory, and has the following solution. After each measurement (of a sequence of measurements), the estimate of the state, X, is refreshed by the two-step procedure:

$$\hat{X}_n^- = \Phi_n \hat{X}_{n-1} \quad (8)$$

$$\hat{X}_n = \hat{X}_n^- + K_n[y_n - H_n\hat{X}_n^-] \quad (9)$$

where
$\hat{X}_n^-$=optimal estimate of vector X just before the $n^{th}$ measurement is processed
$\hat{X}_n$=optimal estimate of vector X immediately after $n^{th}$ measurement is processed
$\Phi_n$=transition matrix for error state vector over $n^{th}$ measurement interval
$K_n$=Kalman gain matrix at $n^{th}$ measurement update To completely define the Kalman filter suitable for the present application, it is necessary to define a set of linear error equations that serve as the basis for defining the transition matrix, $\Phi$, and the measurement matrix, H. The linear error equations that define the error propagation of the strapdown relative navigation solution are defined as follows.

The relative attitude error differential equation is defined by $$\dot{\gamma} = -\{\omega^m\}\gamma - C\delta\omega^s + \delta\omega^m \quad (10)$$

The relative velocity error differential equation is defined by $$\delta\dot{U} = -\{\gamma\}CA^m + C\delta A^m - \delta A^s - \{\omega^m\}\delta U - \{\delta\omega^m\}U \quad (11)$$

The relative position error differential equation is defined by $$\delta\dot{R} = \delta U - \{\omega^m\}\delta R - \{\delta\omega^m\}R \quad (12)$$

The prefiltered relative position error is defined by $$\delta\dot{R}_f = (\delta R - \delta R_f)/\tau \quad (13)$$

where the following definitions apply
$\gamma$=relative attitude error vector
$\delta U$=relative velocity error vector
$\delta R$=relative position error vector
$\delta R_f$=relative position flexure vector
$\delta\omega^s$=slave unit angular rate error vector
$\delta\omega^m$=master unit angular rate error vector
$\delta A^s$=slave unit linear acceleration error vector
$\delta A^m$=master unit linear acceleration error vector
$\{\bullet\}$=skew-symmetric matrix formed from the components of the enclosed vector The error equations defined above in the continuous differential equation form by (10) to (13) serve as the basis for the discretized transition matrix, $\Phi_n$, that spans the $n^{th}$ measurement interval. The discretization approach is similar to that utilized in conventional aided strapdown navigation systems.

The Kalman filter measurement equation in the application of interest becomes $$y = R_f \quad (14)$$

where
y=measurement vector (3×1)
$R_f$=prefiltered relative flexure vector which has associated with it a measurement error equation defined by $$y = \delta R_f + \eta \quad (15)$$

where
y=measurement error vector (3×1)
$\delta R_f$=prefiltered relative flexure error vector
$\eta$=uncorrelated measurement error vector The Kalman filter will compute a state vector of system corrections, $\hat{X}_n$, at the $n^{th}$ update position according to $$\hat{X}_n = -K_n y_n \quad (16)$$

which is a specialized form that assumes the system variables are adjusted in closed-loop fashion after each Kalman filter measurement update, and where the state vector is explicitly defined by $$\hat{X}_n = [\gamma_1 \gamma_2 \gamma_3 \delta V_1 \delta V_2 \delta V_3 \delta R_1 \delta R_2 \delta R_3 \delta R_{f_1} \delta R_{f_2} \delta R_{f_3} b_1^g b_2^g b_3^g b_1^a b_2^a b_3^a]^T \quad (17)$$

in which
$\hat{X}_n$=feedback correction vector
$y_n$=measurement vector
$\gamma_1, \gamma_2, \gamma_3$=attitude corrections
$\delta V_1, \delta V_2, \delta V_3$=velocity corrections
$\delta R_1, \delta R_2, \delta R_3$=position corrections
$\delta R_{f_1}, \delta R_{f_2}, \delta R_{f_3}$=prefiltered relative flexure components
$b_1^g, b_2^g, b_3^g$=gyro bias corrections
$b_1^a, b_2^a, b_3^a$=accelerometer bias corrections
$K_n$=Kalman gain matrix The measurement matrix that reflects the measurement error relationship defined by (15) is as follows $$H_n = [0_{3\times9} I_{3\times3} 0_{3\times6}] \quad (18)$$

In the application of interest, two sets of gyro biases exits, one for the master unit, and one for the slave unit. Similarly, two sets of accelerometer biases exist, one for the master unit, and one for the slave unit. Since the input axes of the two triads are almost coincident, a composite bias that accounts for the individual biases of the master and slave units can be defined for the purpose of the Kalman filter. The gyro bias states $b_1^g, b_2^g$, and $b_3^g$ in the error state vector defined by (17) can be interpreted as composite gyro bias states, and the accelerometer bias states $b_1^a, b_2^a$, and $b_3^a$ in the error state vector can be interpreted as composite accelerometer bias states. The incremental gyro bias and accelerometer bias adjustments generated by the Kalman filter can, accordingly, be applied to either the master unit outputs or the slave unit outputs.

Finally, the Kalman Filter measurement noise covariance matrix for the relative navigation application is addressed. The source of the measurement noise is the flexure motion itself, and measurement prefiltering is utilized to minimize this unwanted component in the measurement. Two factors are important in this regard. First, the effect of the prefilter is to reduce the flexure component in the measurement, but this leads to correlated measurement errors. If the measurement update interval is chosen to be at least twice the value of the prefilter time constant, this correlation may be ignored. Therefore, a tradeoff exists between choosing a prefilter time constant large enough to attenuate the unwanted high-frequency flexure effects in the measurement, but small enough to avoid correlated measurement errors. This constitutes a fairly straightforward tradeoff. For example, if the flexure frequency is on the order of 2 Hz, and an attenuation factor of 5 to 10 is desired, the prefilter time constant would be chosen to be approximately 1 second. Then, because it is desirable to have uncorrelated measurements to the Kalman Filter, a filter update interval of 2 seconds would be selected. The measurement noise $1\sigma$ error would then be equal to the magnitude of the expected flexure divided by the attenuation factor resulting from the use of the prefilter.

These embodiments described herein are described in sufficient detail to enable those skilled in the art to practice the claimed invention, and it is to be understood that other embodiments may be utilized and that logical changes may be made without departing from the scope of the claimed invention.

What is claimed is:

1. A system comprising:
a first unit located at a first position, the first unit operable to generate first unit information that is responsive to a motion of the first position;
a second unit located at a second position nominally offset from the first position by a nominal lever-arm, the second unit operable to generate second unit information that is responsive to a motion of the second position; and
a processing unit operable to receive the first unit information from the first unit and the second unit information from the second unit, the processing unit additionally operable to generate compensated sensor information from the first unit information and the second unit information;
wherein the processing unit generates resets to relative states of a relative navigation solution as a function of the compensated sensor information and reference information,
wherein the compensated sensor information is generated from the first unit information and the second unit information and
wherein the reference information is indicative of at least one of the nominal lever-arm of the second position relative to the first position and a nominal relative velocity of the second position relative to the first position.

2. The system of claim 1, wherein the first unit is a first inertial measurement unit and the second unit is a second inertial measurement unit and wherein compensated sensor information is derived from inertial sensor data received from the first inertial measurement unit and inertial sensor data received from the second inertial measurement unit.

3. The system of claim 2, wherein the system is a relative navigation system, wherein at least one of the first unit and the second unit is collocated with a global positioning system (GPS) antenna and wherein the relative navigation system comprises a portion of a tightly-coupled GPS-aided navigational system.

4. The system of claim 2, wherein the system is a relative navigation system, wherein at least one of the first unit and the second unit is collocated with an electronic surveillance measurement (ESM) antenna and wherein the relative navigation system comprises a portion of a radiation source locating system.

5. The system of claim 1, wherein the processing unit comprises: a data fusion algorithm;
a sensor compensation algorithm operable to generate the compensated sensor information from the first unit information and the second unit information; and
a relative navigation algorithm operable to:
receive the compensated sensor information from the sensor compensation algorithm;
receive the resets from the data fusion algorithm; and
generate the relative states as a function of at least the compensated sensor information,
wherein the data fusion algorithm is operable to:
receive the relative navigation solution and the reference information;
generate the resets based on the relative navigation solution and the reference information; and
output the resets to the relative navigation algorithm,
wherein the resets are corrective feedback used to control errors in the relative navigation solution.

6. The system of claim 5, wherein the processing unit further comprises:
a prefilter that receives the relative states and filters error information that is a function of at least the relative navigation solution.

7. The system of claim 6, wherein the prefilter comprises at least one of a first-order roll-off filter and a notch filter.

8. The system of claim 5, wherein the resets comprise algorithm resets and device resets, and where in the algorithm resets are corrective feedback used to control errors in the relative navigation solution and the device resets are corrective feedback used to control errors in one of the first unit and the second unit.

9. The system of claim 5, wherein the nominal lever-arm is a first lever-arm, the data fusion algorithm is a first data fusion algorithm, the relative navigation algorithm is a first relative navigation algorithm, the reference information is first reference information, the compensated sensor information is first compensated sensor information, the reference information is a first reference information, the resets are first resets and the relative states are first relative states and the relative navigation solution is a first relative navigation solution, the system further comprising:
a third unit located at a third position nominally offset from the first position by a second lever-arm and operable to generate third unit information that is indicative of at least one of a position of the third position and a motion of the third position; and
a second data fusion algorithm;
a second sensor compensation algorithm operable to generate a second compensated sensor information from the first unit information and the third position information; and
a second relative navigation algorithm operable to:
receive the second compensated sensor information from the second sensor compensation algorithm;
receive second resets from the second data fusion algorithm; and
generate second relative states as a function of at least the second compensated sensor information,
wherein the second data fusion algorithm is operable to:
receive a second relative navigation solution and a second reference information;
generate second resets based on the second relative navigation solution and the second reference information; and
output the second resets to the second relative navigation algorithm, wherein the resets are corrective feedback used to control errors in the second relative navigation solution.

10. The system of claim 9, where in the first unit is a first inertial measurement unit, the second unit is a second inertial measurement unit, and the third unit is a third inertial measurement unit and wherein the first compensated sensor information is derived from inertial sensor data received from the first inertial measurement unit and the second inertial measurement unit, and wherein second compensated sensor information is derived from the inertial sensor data received from the first inertial measurement unit and the third inertial measurement unit.

11. The system of claim 9, wherein the first relative states and second relative states are output from the processing unit for use in an external system.

12. The system of claim 11, wherein the external system is selected from a group comprising one of a navigation system, a structure monitoring system, a system to monitor a plurality of structures, an ultra tight coupling global positioning system inertial navigation system, an emitter location system, and combinations thereof.

13. The system of claim 1, wherein the reference information comprises a model of a nominal lever-arm including the first position and the second position.

14. The system of claim 1, wherein the motion of the first position comprises at least one of a velocity of the first position, an acceleration of the first position, and a rotation of the first position.

15. The system of claim 1, further comprising:
- a plurality of units in addition to the first unit and the second unit, the plurality of units each located at a related position and each operable to generate unit information that is responsive to a motion of the unit, wherein each of the plurality of units exclusive of the first unit is located at a position nominally offset from the first position by a respective nominal lever-arm, and wherein each of the plurality of units, exclusive of the first unit, forms a pair of units with the first unit;
- a plurality of relative navigation algorithms in the processing unit each associated with a respective pair of units and each relative navigation algorithm operable to generate relative states of a relative navigation solution for each pair of units; and
- a plurality of data fusion algorithms in the processing unit each associated with one of the plurality of relative navigation algorithms and a respective pair of units, wherein each data fusion algorithm generates resets to the relative states of the relative navigation solution for each pair of units.

16. The system of claim 15, wherein the plurality of units are positioned on at least two dimensions of a semi-flexible structure, and wherein the plurality of the relative states are output from the processing unit for use in an external system to determine relative movements of the plurality of units on the semi-flexible structure.

* * * * *